United States Patent [19]

Noda

[11] Patent Number: 5,781,312
[45] Date of Patent: Jul. 14, 1998

[54] IMAGE INPUT METHOD AND APPARATUS

[75] Inventor: Satoshi Noda, Ebina, Japan

[73] Assignee: Fuji Xerox, Co. Ltd., Tokyo, Japan

[21] Appl. No.: 570,527

[22] Filed: Dec. 11, 1995

[30] Foreign Application Priority Data

Dec. 16, 1994 [JP] Japan ................... 6-312828

[51] Int. Cl.⁶ ................................ H04N 1/04
[52] U.S. Cl. .............. 358/482; 358/407; 358/463; 358/513; 348/272
[58] Field of Search .................... 358/482, 463, 358/443, 454, 407, 446, 513; 348/210, 230, 241, 257, 272; 335/42, 7, 20, 105

[56] References Cited

U.S. PATENT DOCUMENTS

| | | | |
|---|---|---|---|
| 4,682,211 | 7/1987 | Kaji | 358/41 |
| 4,914,519 | 4/1990 | Hashimoto | 358/213.18 |
| 5,216,509 | 6/1993 | Hirasawa | 358/213.15 |
| 5,483,295 | 1/1996 | Kim et al. | 348/695 |

FOREIGN PATENT DOCUMENTS

A-62-185458 8/1987 Japan.
A-63-272169 11/1988 Japan.

*Primary Examiner*—Edward L. Coles, Sr.
*Assistant Examiner*—Madeleine Av Nguyen
*Attorney, Agent, or Firm*—Oliff & Berridge, PLC

[57] ABSTRACT

An image input apparatus capable of reliably reducing random noise and switching noise arising during a dummy pixel period using a simple circuit configuration and providing a high-quality video signal without horizontal lines. The image input apparatus is provided with a clamping circuit made up of a capacitor for feeding an analog image signal supplied from a CCD solid-state image pickup element via a first amplifier to a second amplifier through an alternating-current link, a reference voltage source for generating a predetermined reference voltage VR, and a first switch for effecting switching during the dummy pixel period of the CCD solid-state image pickup element. The clamping circuit is further provided with a resistor disposed between the capacitor and the second amplifier, and a second switch for selectively bridging across the resistor 152. This second switch is complimentarily activated in relation to the operation of the first switch.

10 Claims, 6 Drawing Sheets

IMAGE INPUT METHOD AND APPARATUS

BACKGROUND OF THE INVENTION

1. Field of the Invention

This invention relates to an image input apparatus and method for obtaining an optical image by exposing a subject such as an original to light to converting the optical image thus obtained into an electric input signal. More particularly, the present invention relates to an image input method and apparatus having a signal processing circuit for effecting predetermined processing of an analog electrical signal output from a photoelectric converting element which converts an optical image into an electrical signal.

2. Description of the Prior Art

In recent years, a digital copier has been developed and put into practice which converts an optical image obtained by exposing a subject such as an original to light into a digital electrical signal and copies the thus digitized image onto a medium such as paper. In an image input apparatus used in the image reader of this type, an optical image formed from incident light reflected from the original is converted into an analog signal by use of a solid-state image pickup device such as a CCD, and the analog signal is amplified and converted into a digital signal by a signal processing circuit. The thus converted digital electrical signal is input as digital image data to an image processing device in a poststage.

In addition to an effective signal pixel region, the solid-state image pickup device such as a CCD has a dummy image region in which pixels are optically shielded in order to acquire a black reference level. An analog image signal output from the solid-state image pickup device is processed on the basis of the black reference level obtained during the period of this dummy pixel. The black reference level is inherent to each solid-state image pickup device and has its own level determined by the influence of a DC offset voltage and temperature drift. On the other hand, a dynamic range of an analog-to-digital converter for converting an analog image signal into a digital signal is uniformly determined. To effectively use the dynamic range, the signal processing circuit shifts the black reference level of the analog image signal to a predetermined DC level.

Techniques as disclosed in, for example, Japanese Patent Unexamined Publication Nos. Sho 62-185458 and Sho 63-272169 have been known as conventional techniques relevant to such a signal processing circuit. FIG. 1 shows a signal processing circuit disclosed in Japanese Patent Unexamined Publication No. Sho 62-185458, and FIG. 2 shows a timing chart for explaining the operation of that circuit shown in FIG. 1. A storage-type image sensor 61 outputs a signal V61 in response to a drive signal φ61 output from a timing control circuit 68. The thus output signal V61 is then amplified into a signal V62 by an amplifier 62. This signal V62 is ac-coupled to a capacitor 63.

The timing control circuit 68 outputs a reset signal φ62 during the period of dummy pixels. When a switch 64 is closed in response to the reset signal φ62, the signal V63 is held at an electric potential Vr by a reference voltage source 65, whereby a capacitor 63 is charged up to the electric potential Vr. The reset signal φ62 disappears during the period of effective signal pixels, and the switch 64 becomes open. For this reason, the level of the signal V63 becomes a difference obtained by subtracting a voltage retained in the capacitor 63 from an electric potential of the signal V62 input to the capacitor 63. This signal V63 is delivered to an analog-to-digital converter 67 via an amplifier 66 where the signal is converted into digital image data. By virtue of the above mentioned circuit configuration, a high DC offset voltage (about 3 to 6 V) of the image signal output from the image sensor 61 is canceled once, and it is possible to restore d.c. components of the image signal to a desired DC level by direct-current restoration. Further, it is possible to cancel the influence of the temperature drift included in the image signal.

However, in the previously mentioned conventional signal processing circuit, random noise, such as shot noise of the diode, kTC noise of the amplifier, 1/F noise inevitably originating in the image sensor 61, is amplified by the amplifier 62. Noise arising in the reference voltage source 65 is directly superimposed on the signal V63. Particularly, the noise superimposed on the dummy pixel period of the signal V63 changes the DC reference level up to the amplitude of that noise, which results in light and dark on a contrast signal. The light and dark on the contrast signal appear as horizontal lines having inconsistencies in density when the signal is converted into a two-dimensional image signal, which in turn brings about considerable image degradation. Further, switching noise associated with the opening and closing action of the switch 64 is superimposed on the signal V63, which in turn makes the DC reference level considerably unstable. This instability in the DC reference level also brings about problems associated with the horizontal lines having inconsistencies in density.

A signal processing circuit disclosed in Japanese Patent Unexamined Publication No. Sho 63-272169 is provided with a low-pass filter for eliminating noise components included in an analog image signal output from an image sensor. The level of the analog image signal is compared with a preset threshold voltage level, and the time constant of the low-pass filter is switched between the dummy pixel period and the effective signal pixel period depending on the result of the comparison. However, this conventional technology is directed to selectively eliminating the noise depending on whether the image signal level is larger or smaller than the threshold voltage level. Therefore, in the case of the AC-coupled signal whose signal level shifts depending on whether the output of the image sensor is dark or bright, the initial threshold voltage becomes useless depending on the magnitude of the dark and bright outputs, which makes it difficult to accurately eliminate noise. Further, no special consideration is given to noise developing as a result of the switching action of a sample-and-hold circuit in a previous stage.

SUMMARY OF THE INVENTION

The present invention is conceived in view of the previously mentioned drawbacks in the prior art, and an object of this invention is to provide an image input method and apparatus which can ensure the reduction of random noise developing, particularly, during a dummy pixel period using a simple circuit configuration and to provide a high-quality video signal without horizontal line noise.

Another object of the present invention is to provide an image input method and apparatus which can significantly reduce switching noise resulting from the shifting of a black reference level.

According to a first aspect of the present invention, these objects are attained by an image input apparatus comprising:

photoelectric converting element which converts an optical image obtained resulting from exposing a subject to light into an electrical signal;

direct-current component eliminating means which eliminates direct-current components from the electric current received from the photoelectric converting element and outputs a resultant signal to a circuit in a following stage;

reference voltage feeding means for feeding a reference voltage;

a first switch being connected at one end thereof to a signal line between the direct-current component eliminating means and the circuit in the following stage and connected at the other end thereof to the reference voltage feeding means; and eliminating means for eliminating noise developing when the first switch becomes open.

An image input device according to a second aspect of the present invention is similar to the image input device defined in the first aspect, but the direct-current component eliminating means is a capacitor connected in series with the photoelectric converting element and the circuit in the following stage.

An image input device according to a third aspect of the present invention is similar to the image input device defined in the first aspect, but the reference voltage feeding means is a d.c. power supply.

An image input device according to a fourth aspect of the present invention is similar to the image input device defined in the first aspect, but it further comprises a plurality of photoelectric converting elements for converting optical images in different colors into electrical signals, and the photoelectric converting element with the minimum signal-to-noise ratio is provided with the eliminating means.

An image input device according to a fifth aspect of the present invention is similar to the image input device defined in the first aspect, but it further comprises a second switch connected in parallel to the signal line connecting between the direct-current component eliminating means and the circuit in the following stage, and the eliminating means closes the second switch in synchronism with the opening action of the first switch.

An image input device according to a sixth aspect of the present invention is similar to the image input device defined in the fifth aspect, but the first switch and the second switch generate switching noise having the same characteristics.

An image input device according to a seventh aspect of the present invention is similar to the image input device defined in the fifth aspect, but it further comprises a resistor connected in parallel to the second switch.

In the image input apparatus having the above constructions, when the first switching means is closed during a predetermined period which is associated with the operation of the photoelectric converting element, a predetermined reference voltage fed from the reference voltage source appears on the signal line connecting the end of the resistor to the circuit in the following stage. As a result, the capacitor is charged by a difference, between the level of the signal output from the photoelectric converting element and the reference voltage, which is obtained during the period in which the first switching means is closed. If the second switching means becomes open at this time, the resistor becomes connected in series with the capacitor, thereby forming a low-pass filter. The signal is smoothed by this low-pass filter, and, in consequence, the noise of the signal is reduced within the predetermined period. On the other hand, as a result of the opening action of the first switching means and the closing action of the second switching means during the period other than the predetermined period, the second switching means bypasses the resistor, whereby the signal output from the photoelectric converting element is subjected to direct-current restoration relative to the previously mentioned predetermined voltage.

In the image input device having the above construction, switching noise resulting from switching of the first switching means is superimposed on the signal flowing through the signal line between the resistor and the circuit in the following stage. At this time, the second switching means operates in a complimentary manner with respect to the operation of the first switching means, as a result of which the switching noise of the first switching means and the switching noise of the second switching means cancel each other. Consequently, the switching noise resulting from operation of the first switching means as well as the noise occurred during the predetermined period are reduced.

As described above, in the image input apparatus as defined in the first through seventh aspects of the present invention, a signal processing circuit is made up of the direct-current component eliminating means which ac-couples a signal output from the photoelectric converting element to the circuit in the following stage, the reference voltage source means for generating a predetermined reference voltage, and the first switching means which effects switching during a predetermined period associated with the operation of the photoelectric converting element. The signal processing circuit is further provided with the resistor connected between the direct-current component eliminating means and the circuit in the following stage, and the second switching means connected in parallel to this resistor. The second switching means becomes open when the first switching means is closed, so that the resistor becomes connected in series with the direct-current component eliminating means, thereby forming a low-pass filter. This low-pass filter renders the signal smooth, and hence it becomes possible to reduce the signal noise during that period. Particularly, the second switching means is activated in response to the operation of the first switching means, whereby the switching action of the second switching means is controlled on a time-based manner. Where the level of the analog signal shifts depending on whether the output from the photoelectric converting element is dark or bright, it is possible to ensure the reduction of the noise during that predetermined period.

In the signal processing circuit having the previously mentioned constructions, the second switching means is complementarily activated in relation to the first switching means. The switching noise of the first switching means and the switching noise of the second switching means cancel each other. It is possible to reduce the switching noise caused by the operation of the first switching means as well as the noise arising in the above mentioned predetermined period.

According to an eighth aspect of the present invention, there is provided an image input device comprising:

a photoelectric converting element which converts an optical image obtained resulting from exposing a subject to light into an electrical signal;

direct-current component eliminating means which eliminates direct-current components from the electrical signal received from the photoelectric converting element and outputs the resultant signal to a circuit on a subsequent stage;

reference voltage feeding means for feeding a reference voltage;

a first switch being connected at one end thereof to a signal line between the direct-current component eliminating means and the circuit in the following stage and connected at the other end thereof to the reference voltage feeding means; and a resistor connected in series with the first switch.

In the image input apparatus having the above construction, if the switching means is closed during a predetermined period which is associated with the operation of the photoelectric converting element, a predetermined reference voltage fed from the reference voltage source appears on the signal line between the capacitor and the circuit in the following stage. As a result, the capacitor is charged by a difference, between the level of the signal output from the photoelectric converting element and the reference voltage, which occurs during the period in which the first switching means is closed. At this time, the resistor becomes connected in series with the capacitor, thereby forming a low-pass filter. The signal is smoothed by this low-pass filter, and, in consequence, the noise of the signal within the predetermined period is reduced. On the other hand, as a result of the opening action of the switching means during the period other than the predetermined period, the end of the resistor connected to the switching means becomes open, whereby the signal output from the photoelectric converting element is subjected to direct-current restoration relative to the previously mentioned predetermined voltage.

In the image input apparatus as defined in the eighth aspect, a signal processing circuit is made up of the direct-current component eliminating means which ac-couples a signal output from the photoelectric converting element to the circuit in the following stage, the reference voltage source means for generating a predetermined reference voltage, and the switching means for effecting switching during a predetermined period associated with the operation of the photoelectric converting element. The signal processing circuit is further provided with the resistor connected in series with the switching means. When the switching means is closed, the resistor becomes connected in series with the direct-current component eliminating means, thereby forming a low-pass filter. This low-pass filter smooths the signal, and hence it becomes possible to ensure the reduction of the noise of the signal occurred during that period. This signal processing circuit requires only one resistor, which enables noise reduction with a very simple circuit configuration.

The image input device according to a ninth aspect of the present invention is similar to the image input device defined in the eight aspect, but it further comprises a plurality of photoelectric converting elements for converting optical images in different colors into electrical signals, and the photoelectric converting element with the minimum signal-to-noise ratio is provided with the resistor.

According to a tenth aspect of the present invention, there is provided a method of inputting an image comprising:

- a photoelectric converting step in which an optical image obtained resulting from exposing a subject to light is converted into an electrical signal;
- a direct-current component eliminating step in which direct-current components are eliminated from the electrical signal generated in the photoelectric converting step;
- a reference voltage application step in which a reference voltage is applied to the electrical signal from which the direct-current components have already been eliminated in the direct-current component eliminating step;
- a reference voltage release step in which the reference voltage applied to the electrical signal in the reference voltage application step is released; and
- a noise eliminating step in which noise developing as a result of the release of the reference voltage in the reference voltage release step is eliminated.

As mentioned above, the reduction of the switching noise, as well as the noise arising in the predetermined period associated with the operation of the photoelectric converting element can be ensured. In consequence, the direct current reference level is prevented from varying for noise, which provides a direct current reference with higher accuracy. Therefore, it is possible to provide an image input method and apparatus which can eliminate linear inconsistencies in density, which are easily and visually noticeable for an audience, in the most effective way.

BRIEF DESCRIPTION OF THE DRAWINGS

The above and other objects and features of the present invention will be more apparent from the following description taken in conjunction with the accompanying drawings.

DETAILED DESCRIPTION OF THE PREFERRED EMBODIMENTS

With reference to the accompanying drawings, preferred embodiments in which the present invention is applied to, e.g., a CCD solid-state image pickup element will be described in detail hereinbelow. As a matter of course, the present invention is not limited to or by the CCD solid-state image pickup element application. The present invention is applicable not only for solid-state image pickup elements other than CCD but also for photoelectric converting elements, in general, capable of converting an optical image, obtained as a result of exposing a subject to light, into an electrical signal.

Figure 1:
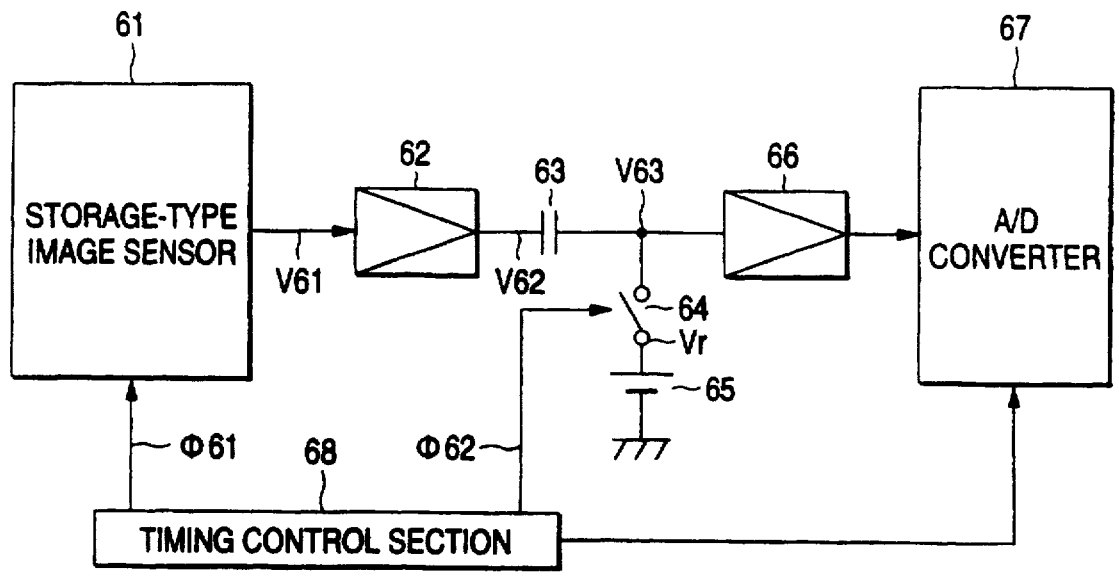
FIG. 1 is a block diagram showing a conventional image input apparatus.
Figure 2:
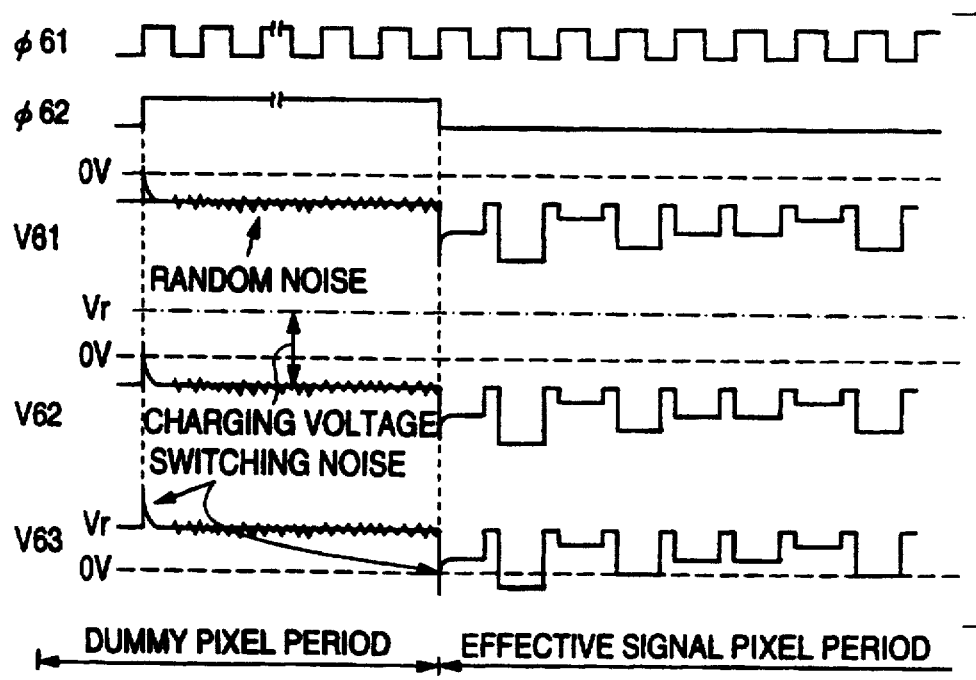
FIG. 2 is a timing chart for explaining the operation of the conventional image input apparatus.
Figure 3:
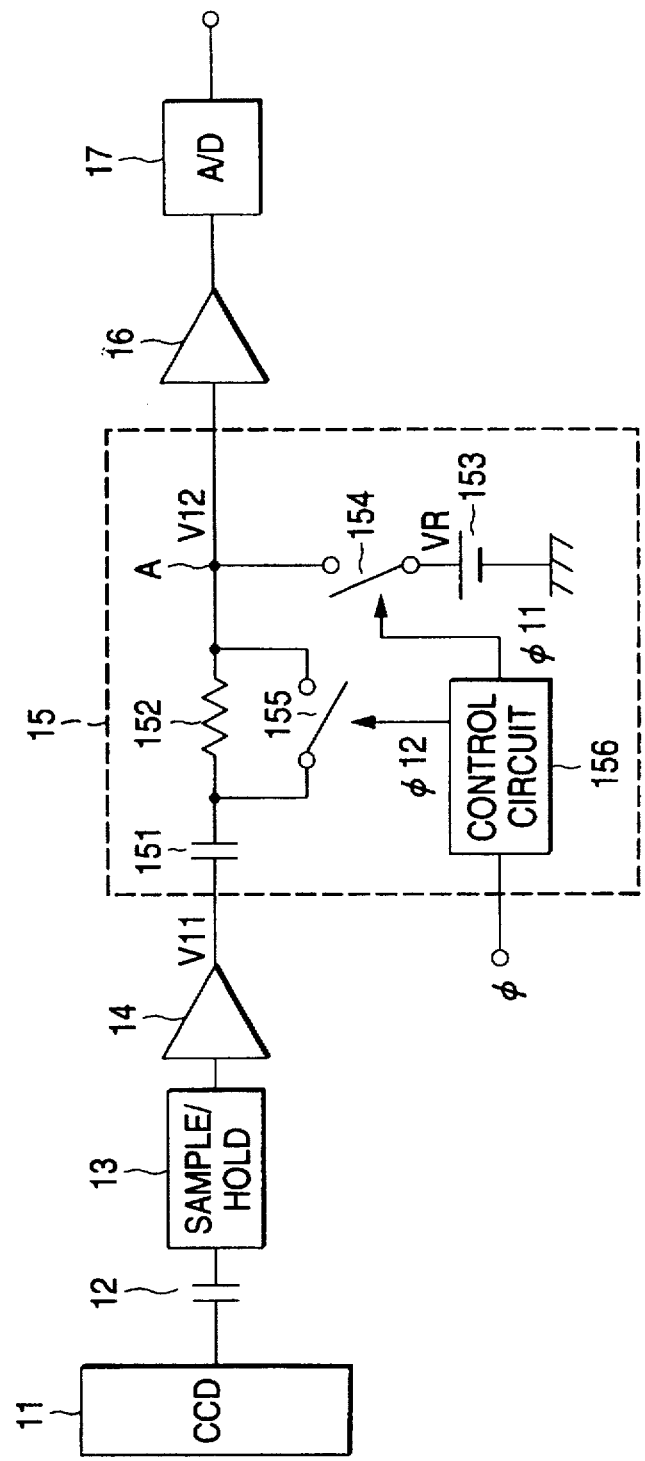
FIG. 3 is a circuit diagram showing an image input apparatus according to a first embodiment.

FIG. 3 is a circuit diagram showing an image input apparatus according to a first embodiment of the present invention. In FIG. 3, a signal processing circuit for converting an analog image signal output from a CCD solid-state image pickup element 11 comprised of a photoelectric converting element is made up of a capacitor 12 for ac-coupling purposes, a sample-and-hold circuit 13 for sampling and holding an analog image signal received via the capacitor 12, a first amplifier 14 for amplifying the thus sampled and held output, a clamping circuit 15 for clamping a direct-current reference of the amplified output to a predetermined reference voltage, a second amplifier 16 for amplifying the output from the clamping circuit, and an analog-to-digital converter 17 which outputs digital image data by converting the output amplified by the amplifier into digital form.

The clamping circuit 15 is made up of a capacitor 151 for ac-coupling purposes that receives, at one end thereof, the analog image signal delivered via the first amplifier 14, a resistor 152 with one end thereof connected to the remaining end of the capacitor 151, a reference voltage source 153 for generating a predetermined reference voltage VR, a first switch 154 connected between the remaining end of the resistor 152 and the reference voltage source 153, a second switch 155 connected in parallel to the resistor 152 for selectively bypassing the resistor 152, and a control circuit 156 for generating switching signals φ11 and φ12 based on a system clock φ used in the CCD solid-state image pickup element 11 and which controls the opening and closing action of the respective first and second switches 154, 155 using the switching signals φ11 and φ12.

The operation of the signal processing circuit of the first embodiment having the previously mentioned construction will now be described. An analog image signal having direct-current components of about 3 to 6 volts output from the CCD solid-state image pickup element 11 is fed to the sample-and-hold circuit 13 via the capacitor 12 where the analog image signal is sampled and held. This sample-and-hold circuit 13 eliminates noise having a fixed form such as reset noise originating in the CCD solid-state image pickup element 11. The white reference level of the signal is amplified so as to be close to the upper limit of the dynamic range of the analog-to-digital converter 17 by the first amplifier 14 in the following stage. Thereafter, the amplified signal is fed to the clamping circuit 15. The analog image signal having passed through the clamping circuit 15 is subjected to offset adjustment in the second amplifier 16 following the clamping circuit 15, and the offset controlled signal is delivered to the analog-to-digital converter 17.

Figure 4:
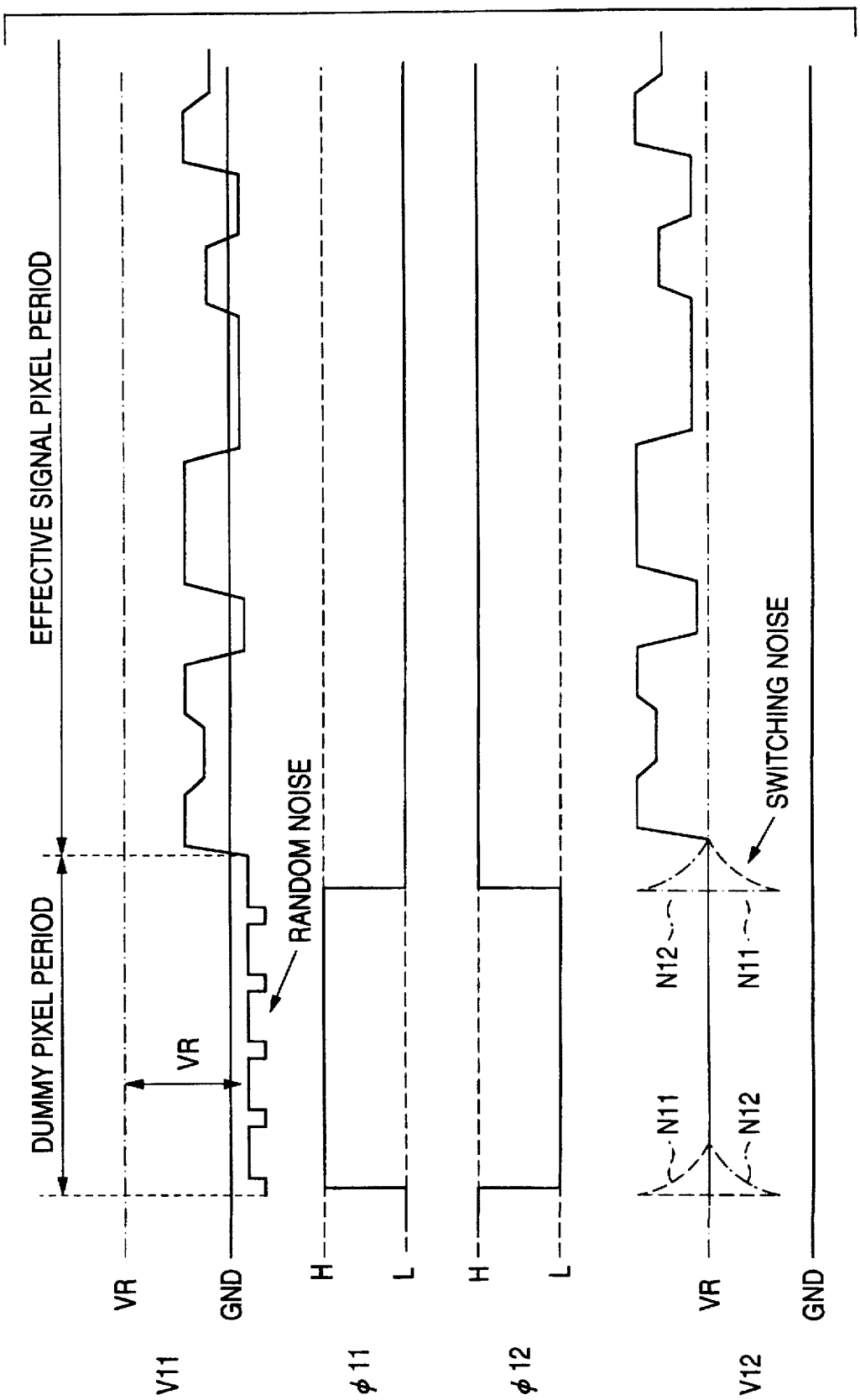
FIG. 4 is a timing chart for explaining the operation of the image input apparatus of the first embodiment.

The operation of the clamping circuit 15 will be described with reference to the timing chart shown in FIG. 4. As shown in FIG. 4, random noise is superimposed on the overall video waveform of a signal V11 output from the amplifier 14. With respect to this signal V11, the control circuit 156 generates the switching signal φ11 which becomes high during the period of dummy pixels and the switching signal φ12 which becomes low during the same period every one cycle of the operation of the CCD solid-state image pickup element on the basis of a system clock φ. Specifically, the control circuit 156 complimentarily controls the opening and closing action of the switches 154 and 155 in such a way that the first switch 154 becomes closed whilst the second switch 155 becomes open during the dummy pixel period, using the switching signals φ11 and φ12 which are opposite in phase to each other.

As a result, the reference voltage VR determined by the reference voltage source 153 appears at a node A, whereby the capacitor 151 is charged solely by a potential difference between the signal level of the signal V11 (hereinafter referred to as a dummy level) and the reference voltage VR during the dummy pixel period. At this time, the resistor 152 becomes connected in series with the capacitor 151, as a result of which the capacitor 151 and the resistor 152 in combination forms a low-pass filter. In consequence, filtering action is effected. On the assumption that the capacitance of the capacitor 151 is C and the resistance of the resistor 152 is R, the signal having a frequency of more than fc−1/(2π C R) [hz] is suppressed, and the noise components corresponding to this band are reduced. In other words, a signal V12 of the node A which is shown in FIG. 4 is smoothed during the dummy pixel period.

During the period of effective signal pixels, the control circuit 156 drives the switching signal φ1 low and the switching signal φ2 high, and complimentarily actuates the first and second switches in such a way that the first switch 154 becomes open and the second switch 155 becomes closed. As a result, the voltage made by adding the voltage corresponding to the voltage stored in the capacitor 151 to the reference voltage VR appears at the node A. This voltage is held for a period of one line of the CCD solid-state image pickup element 11. In other words, the analog image signal output from the CCD solid-state image pickup element 11 is restored with respect to the reference voltage VR by direct-current restoration. At this time, the on-resistance of the second switch 155 is sufficiently small, and therefore the analog image signal does not undergo low-pass filtering effects. In consequence, the waveform of the analog image signal remains sharp.

As previously mentioned, the clamping circuit 15 that clamps a dummy level of the analog image signal to the reference voltage VR is provided with a resistor 152 connected between the capacitor 151 and the second amplifier 16, and a second switch 155 for selectively bridging across the resistor 152. This second switch 155 is kept closed except for during the dummy pixel period, so that the resistor 152 is bypassed. During the dummy pixel period, the action of the low-pass filter made up of the capacitor 151 and the resistor 152 enables reduction of random noise inherent to the CCD solid-state image pickup element 11. Particularly, the opening and closing action of the second switch 155 is controlled independent of the magnitude of the analog image signal level with respect to the threshold voltage level, but they are controlled in a time-based manner based on the system clock φ. Where the level of the analog image signal shifts depending on whether the output of the CCD solid-state image pickup element 11 is bright or dark, it is possible to ensure the reduction of noise. As a result, it becomes possible to reduce variations in electric potential of the analog image signal on a line-to-line basis.

Further, the first switch 154 and the second switch 155 are complementarily opened and closed, whereby switching noise N12 arising as a result of the switching action of the second switch 155 and switching noise N11 of the first switch 154 cancel each other, as shown in the timing chart in FIG. 4. The switching noise as well as the random noise are eliminated during the dummy pixel period of the signal V12, thereby resulting in a considerably stable signal. The black reference level of the thus stable signal V12 is subjected to offset adjustment so as to match the lower limit of dynamic range of the analog-to-digital converter 17, and the thus adjusted signal is then fed to the analog-to-digital converter 17. In consequence, the image signal that has been finally converted into digital form is considerably improved with respect to horizontal linear inconsistencies in density.

In the previously mentioned first embodiment, the first switch 154 and the second switch 155 are designed so as to open and close complementarily. Further, it may be possible to arrange these switches not in such a way that they open and close in a completely complementary manner but such that the second switch 155 is opened or closed with slight delayed timing in response to the closing or opening action of the first switch 154. Even in this arrangement, the random noise originating in the CCD solid-state image pickup element 11 can be reduced as a result of the action of the low-pass filter made up of the capacitor 151 and the resistor 152 when the second switch 155 becomes open. However, in this case, it is impossible to reduce the switching noise because the first and second switches 154, 155 are opened and closed at slightly different timing in relation to each other.

Figure 5:
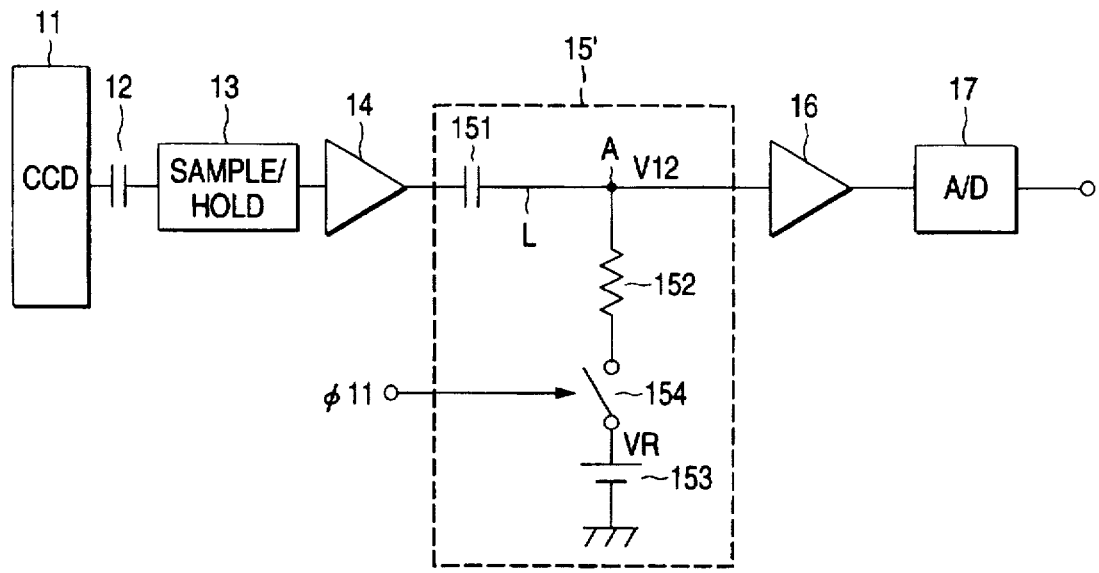
FIG. 5 is a circuit diagram showing an image input apparatus according to a second embodiment.

FIG. 5 is a circuit diagram showing an image input apparatus according to a second embodiment of the present invention. In this drawing, the same reference numerals are provided to designate corresponding elements shown in FIG. 3, and therefore the explanation thereof will be omitted here for brevity. The image input apparatus of the second embodiment features the circuit configuration of a clamping circuit 15'. In other words, the clamping circuit 15' is provided with a resistor 152 connected between a switch 154 and a signal line L which connects the capacitor 151 to the second amplifier 16, and the second switch 155 used in the first embodiment is omitted from the clamping circuit 15'. The clamping circuit 15' is completely the same in configuration as the clamping circuit 15 of the first embodiment except for the above mentioned point. Although omitted from FIG. 5, a control circuit (corresponding to the control circuit shown in FIG. 3) is also provided which generates the switching signal "11 and controls the opening and closing action of the switch 154 using this switching signal φ11).

In the second embodiment with the above mentioned construction, the switching signal φ11 becomes high during the dummy pixel period of the CCD solid-state image pickup element 11, as in the first embodiment, which results in the switch 154 being closed. In consequence, the capacitor 151 is charged by the reference voltage VR of the reference voltage source 153. At this time, the resistor 152 becomes connected in series with the capacitor 151. The capacitor 151 and the resistor 152 form a low-pass filter as they do in the first embodiment, whereby filtering action is obtained. This filtering action enables considerable reduction of the random noise arising during the dummy pixel period. Subsequently, the switching signal φ11 becomes low during the effective signal pixel period, thereby resulting in the switch 154 becoming open. As a result, the effective pixel signal held to the direct-current voltage appears at the node A as the signal V12, and this signal V12 is fed to the second amplifier 16. At this time, the end of the resistor 152 connected to the switch 154 becomes open. For this reason, the effective pixel signal is restored without any influence of the resistor 152, by direct-current restoration.

As previously mentioned, in the second embodiment, the resistor 152 is connected between the switch 154 and the signal line L that connects the capacitor 151 to the second amplifier 16. In consequence, when the switch 154 is closed during the dummy pixel period, the capacitor 151 and the resistor 152 form a low-pass filter which eliminates the random noise arising in the dummy pixel period, thereby resulting in a stable image output with reduced potential variations for each line. Particularly, the low-pass filter is reliably formed during the dummy pixel period as a result of the closing action of the switch 155. Accordingly, as in the first embodiment, even where the level of the analog image signal shifts depending on whether the output from the CCD solid-state image pickup element 11 is dark or bright, the reduction of the noise arising in the dummy pixel period can be ensured.

As a result of the connection of the resistor 152 between the signal line L and the switch 154, it is possible to form a low-pass filter only during the dummy pixel period by the operation of the switch 154 without the use of the second switching means for selectively bridging across the resistor 152. As in the first embodiment, although the reduction of the switching noise resulting from the switching action of the switch 154 is not implemented, it is possible to reliably reduce the noise arising during the dummy pixel period using a simple circuit configuration, that is, the control circuit having only one resistor added.

Figure 6:
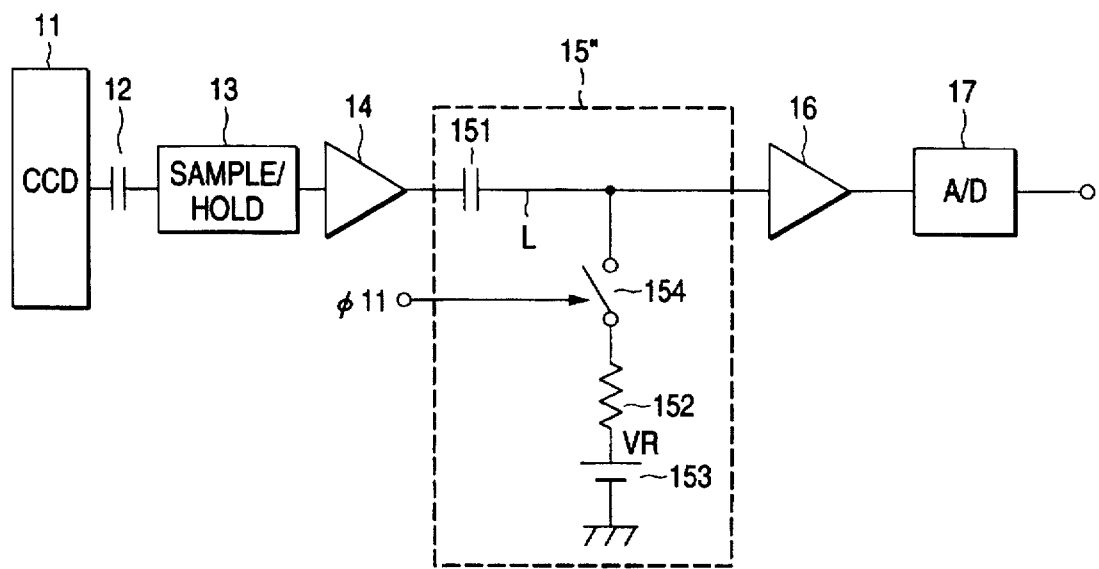
FIG. 6 is a circuit diagram showing a modified example of the image input apparatus of the second embodiment.

In the second embodiment, the explanation was given of the clamping circuit 15' comprised of the resistor 152 connected between the signal line L and the switch 154. As shown in FIG. 6, it may be possible to constitute a clamping circuit 15" by connecting the resistor 152 between the reference voltage source 153 and the switch 154. Even in this case, it is possible to obtain the same circuit configuration, operation, and effects as they are obtained in the second embodiment. In short, it is essential only that the resistor 152 and the switch 154 be connected between the signal line L and the reference voltage source 153.

Figure 7:
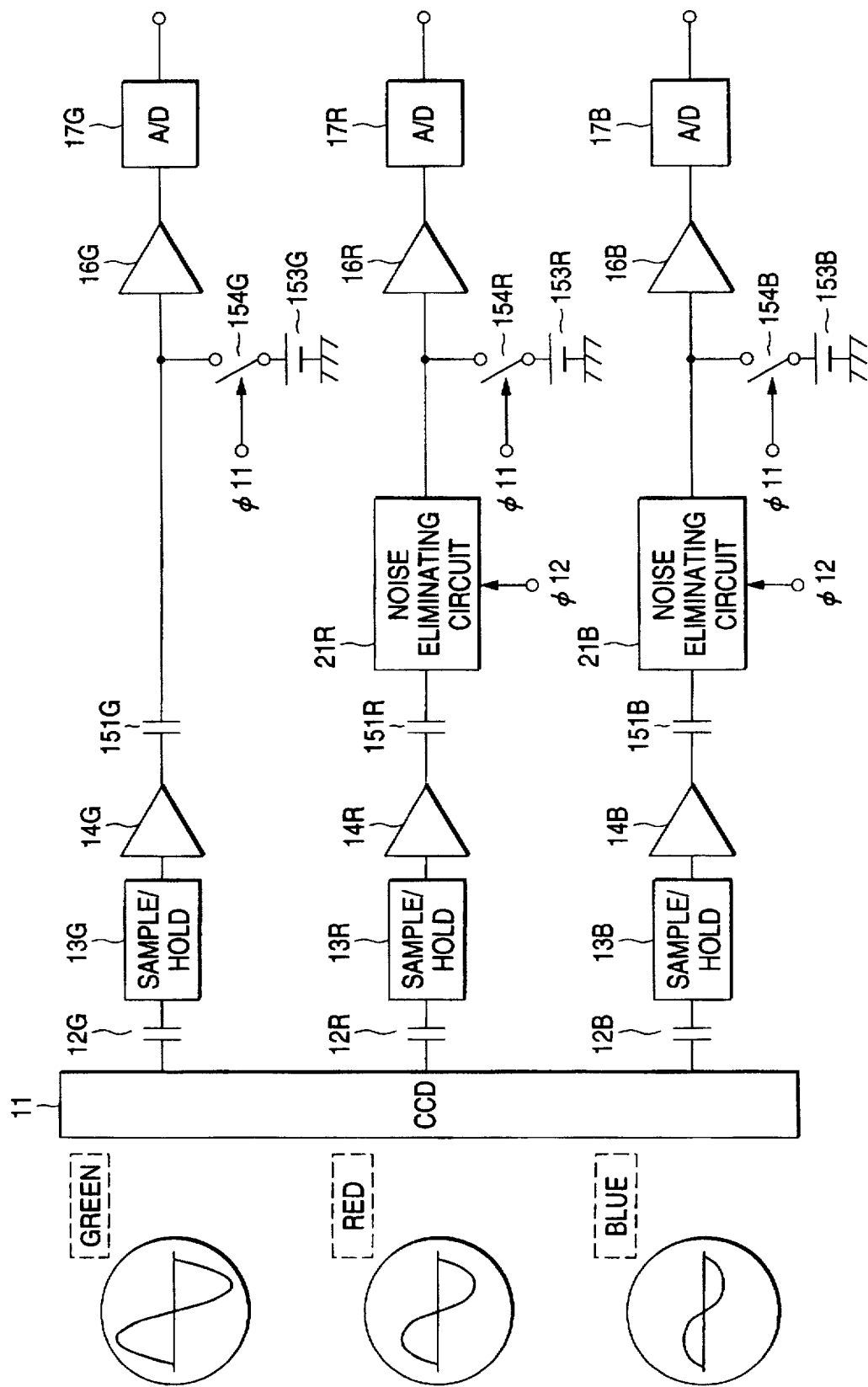
FIG. 7 is a block diagram showing an application of the present invention.

FIG. 7 is a block diagram showing an application of the present invention. The present invention is applied to a color image input apparatus for separating light into a plurality of colors in which an optical systems or the CCD solid-state image pickup element 11 is provided with color filters. In this application, the color CCD solid-state image pickup element 11 for separating light into the primary colors, i.e., blue (B), green (G), and red (R), outputs three different analog image signals for the respective primary colors. The amount of the signal for each color changes even when a white substance is read by the image pickup element, because the quantity of the energy of the light reached to a sensor in each pixel varies for each color depending on the emission spectrum of the light source and transmission spectrum of the color separation filter. In other words, the level of the analog signal becomes smaller as the luminous energy is smaller. For example, assuming that light is separated into the primary colors, i.e., BGR, using a tungsten lamp (2500 to 4000K) as the light source for illuminating an original, the image signals are ranked in order of magnitude, namely, B<G<R. On the other hand, the amount of noise is substantially constant irrespective of colors, and hence the color signals become ranked B=G=R, in view of the quantity of noise.

Ordinarily, the maximum levels of the signals for the respective colors are made even so as to match the dynamic range of the analog-to-digital converter, and the signal is amplified for each color. Accordingly, the signals become ranked B=G=R but ranked B>G>R in view of the amount of noise. In this application, the noise eliminating function is not provided for all of the colors to remove a difference in signal-to-noise ratio originating in the color image reader, but the noise eliminating function is provided solely for the color that is inferior in signal-to-noise ratio to the other colors, in order to reduce the cost and size of the apparatus. Specifically, in this application, noise eliminating circuits 21R and 21B are provided for R and B that are inferior in signal-to-noise ratio to G. These noise eliminating circuits 21R and 21B are equivalent to, for example, the parallel circuit comprised of the resistor 152 and the second switch 155 used in the first embodiment shown in FIG. 3. In FIG. 7, the same reference numerals are provided to designate the corresponding features shown in FIG. 3, and the numerals are provided with G, B, and R for the respective colors. Although not shown in the drawings, the second embodiment shown in FIG. 5 and its modified example shown in FIG. 6, as well as the first embodiment, are, as a matter of course, similarity applicable to this application.

In this application, the noise eliminating circuits are provided for R and B in the primary color separation system. Although not shown in the drawings, it goes without saying that the noise eliminating circuit is usable only for B which has the worst signal-to-noise ratio among the primary colors. Further, the use of the noise eliminating circuit is not limited to the color image input apparatus having the three-color separation system. Needless to say, it is also possible to selectively provide an image input apparatus having more than two or four color separation systems with noise eliminating circuits depending on the inferiority or superiority of the signal-to-noise characteristics of each color separation system.

Figure 8:
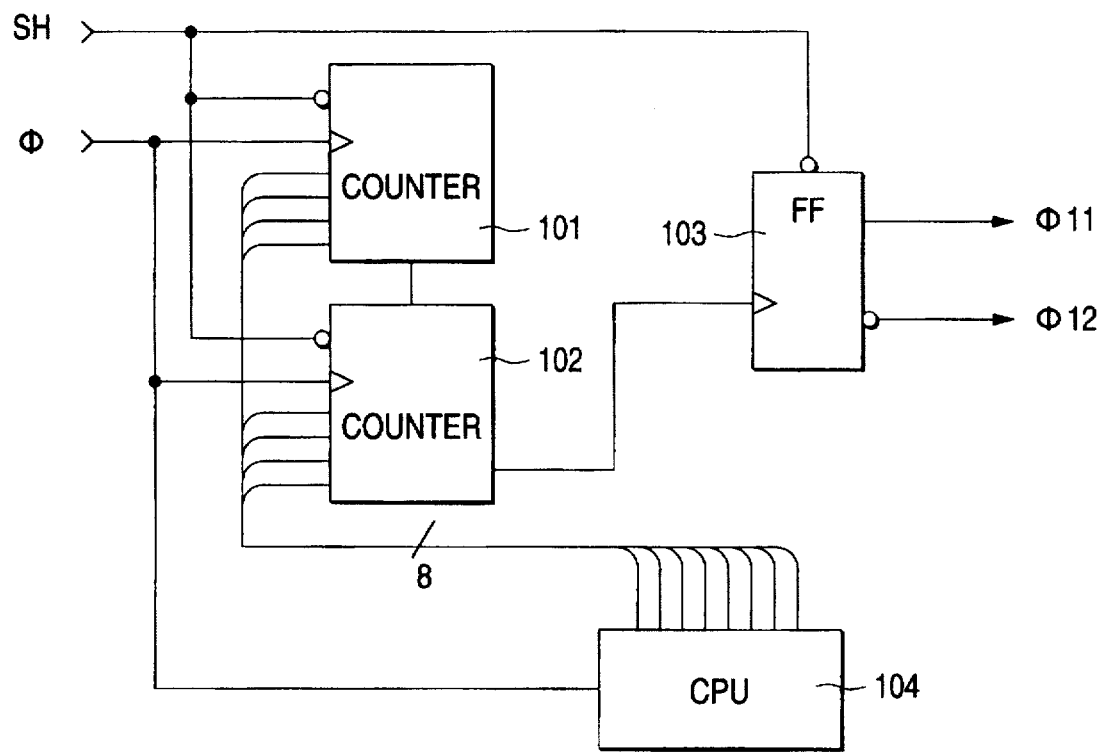
FIG. 8 is a circuit diagram showing a one-line readout period determining section of the present invention.
Figure 9:
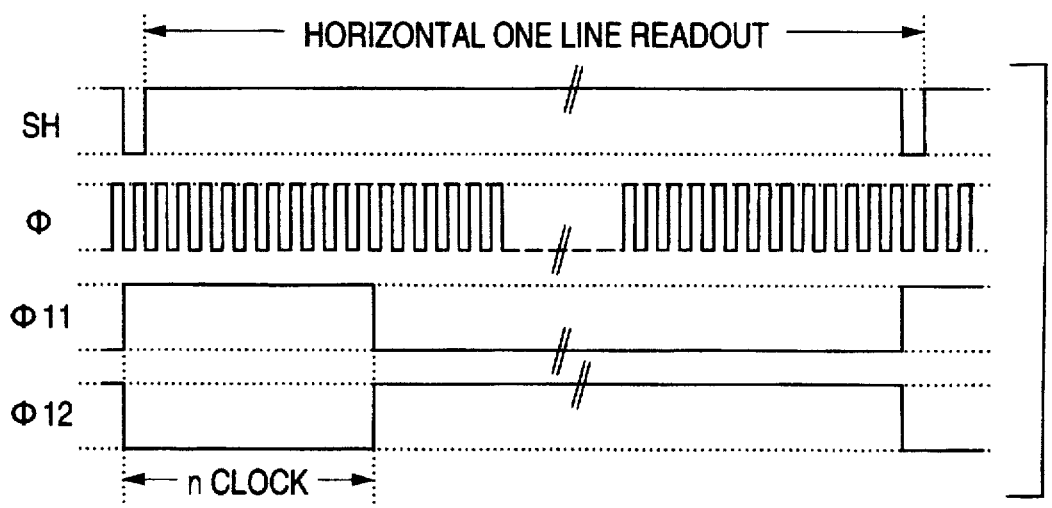
FIG. 9 is a timing chart for explaining the operation of the one-line readout period determining section of FIG. 8.

Now, a description will be given of a circuit for determining a period for reading a CCD signal for one line at the cycle of the synchronization pulse with reference to FIGS. 8 and 9.

Reference symbol SH denotes a vertical transmission synchronization pulse, and a period for reading a CCD signal for one line at the cycle of the synchronization pulse is determined by this period. Counters 101 and 102 are 4-bit counters, and each counter can count an input clock φ up to $2^4=16$. If these counters 101 and 102 are cascaded, it is possible for them to count the clock up to $2^8=256$.

To begin with, SH clears a flip-flop (FF) circuit to set the signal φ11 to high and the signal φ12 to low. At the same time, the counters 101 and 102 are reset, and they start to count based on the system clock φ. The number of counts can be determined by logic of (4-bit input terminals of the counters 1 and 2)×2=8 bits. If a carrier signal which is output when the number of counts reaches a predetermined number is input to a clock input of the flip-flop circuit 103, the signals φ11 and φ12 are respectively reversed. The signals remain unchanged until they are reset again by the next SH.

It is possible to arbitrarily control the number "n" of clocks using a CPU 104, and the number is usually set to the number of shielded pixels of a CCD image sensor which is used.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image input apparatus comprising:
   photoelectric converting means for converting an optical image resulting from exposing a subject to light into an electrical signal;
   direct-current component eliminating means for eliminating direct-current components from the electric current received from said photoelectric converting means to output a resultant signal to a circuit in a poststage;
   reference voltage feeding means for feeding a reference voltage;
   a first switch being connected at one end thereof to a signal line between said direct-current component eliminating means and the circuit in the poststage and connected at the other end thereof to said reference voltage feeding means; and
   eliminating means for eliminating noise developing when said first switch becomes open.

2. The image input device as defined in claim 1, wherein said direct-current component eliminating means comprises a capacitor connected in series with said photoelectric converting means and the circuit in the poststage.

3. The image input device as defined in claim 1, wherein said reference voltage feeding means comprises a d.c. power supply.

4. An image input device, comprising:
   photoelectric converting means for converting an optical image resulting from exposing a subject to light into an electrical signal;
   direct-current component eliminating means for eliminating direct-current components from the electrical signal received from said photoelectric converting means to output the resultant signal to a circuit on a poststage;
   reference voltage feeding means for feeding a reference voltage;
   a first switch being connected at one end thereof to a signal line between said direct-current component eliminating means and the circuit in the poststage and connected at the other end thereof to said reference voltage feeding means; and
   a resistor connected in series with said first switch.

5. The image input device as defined in claim 4, further comprising a plurality of photoelectric converting elements for converting optical images in different colors into electrical signals;
   wherein said photoelectric converting element with the minimum signal-to-noise ratio includes said resistor.

6. A method of inputting an image, comprising the steps of:
   photoelectrically converting an optical image resulting from exposing a subject to light into an electrical signal;
   eliminating direct-current components from the electrical signal generated in said converting step;
   applying a reference voltage to the electrical signal from which the direct-current components have already been eliminated in said eliminating step; releasing the reference voltage applied to the electrical signal in said applying step; and
   eliminating noise developing as a result of the release of the reference voltage in said releasing step.

7. An image input apparatus comprising:
   photoelectric converting means for converting an optical image resulting from exposing a subject to light into an electrical signal;
   direct-current component eliminating means for eliminating direct-current components from the electric current received from the photoelectric converting means to output a resultant signal to a circuit in a poststage;
   reference voltage feeding means for feeding a reference voltage;
   a first switch being connected at one end thereof to a signal line between the direct-current component eliminating means and the circuit in the poststage and connected at the other end thereof to the reference voltage feeding means;
   eliminating means for eliminating noise developing when the first switch becomes open; and
   a plurality of photoelectric converting elements having a characteristic signal-to-noise ratio for converting optical images in different colors into electrical signals;
   wherein a photoelectric converting element with a minimum signal-to-noise ratio includes the eliminating means.

8. An image input apparatus comprising:
   photoelectric converting means for converting an optical image resulting from exposing a subject to light into an electrical signal;

direct-current component eliminating means for eliminating direct-current components from the electric current received from the photoelectric converting means to output a resultant signal to a circuit in a poststage;

reference voltage feeding means for feeding a reference voltage;

a first switch being connected at one end thereof to a signal line between the direct-current component eliminating means and the circuit in the poststage and connected at the other end thereof to the reference voltage feeding means;

eliminating means for eliminating noise developing when the first switch becomes open; and a second switch connected in parallel to the signal line that connects the direct-current component eliminating means and the circuit in the poststage;

wherein the eliminating means closes the second switch in synchronism with the opening action of the first switch.

9. The image input device as defined in claim 8, wherein said first switch and said second switch generate switching noise having the same characteristics.

10. The image input device as defined in claim 8, further comprising a resistor connected in parallel to said second switch.

* * * * *